United States Patent
Faust

(10) Patent No.: US 8,757,723 B1
(45) Date of Patent: Jun. 24, 2014

(54) AIRLINE/TRAIN TRAVEL STEP

(71) Applicant: Leona Natalie Faust, Glen Head, NY (US)

(72) Inventor: Leona Natalie Faust, Glen Head, NY (US)

(*) Notice: Subject to any disclaimer, the term of this patent is extended or adjusted under 35 U.S.C. 154(b) by 0 days.

(21) Appl. No.: 13/743,129

(22) Filed: Jan. 16, 2013

(51) Int. Cl.
  *A47C 7/52* (2006.01)
(52) U.S. Cl.
  USPC .................................. 297/423.39; 297/423.4
(58) Field of Classification Search
  USPC .......................... 297/423.39, 423.4
  See application file for complete search history.

(56) References Cited

U.S. PATENT DOCUMENTS

| | | | | |
|---|---|---|---|---|
| 4,874,203 A * | 10/1989 | Henley | ........................ | 297/250.1 |
| D341,696 S * | 11/1993 | Payne | ............................ | D2/871 |
| 6,338,527 B1 * | 1/2002 | Toyota et al. | ................. | 297/229 |
| 7,448,688 B2 * | 11/2008 | Farah | ........................ | 297/423.39 |
| 7,967,387 B2 * | 6/2011 | Langhorn | ................... | 297/423.4 |
| 8,061,773 B2 * | 11/2011 | Collias | ...................... | 297/256.16 |
| 8,403,420 B2 * | 3/2013 | Billescas | ................. | 297/423.19 |

* cited by examiner

Primary Examiner — Sarah B McPartlin

(57) ABSTRACT

A portable cushion and foot rest allows mass transit passengers, especially those in economy class, to rest their feet on an adjustable step. The cushion and foot rest adds comfort to passenger's "bottoms" as well as rests their feet for long flights. The cushion and foot rest folds easily for easy carry-on and stays in position by the weight of the passenger sitting on it. The cushion and foot rest can alleviate aches, pain and leg and foot cramping.

7 Claims, 2 Drawing Sheets

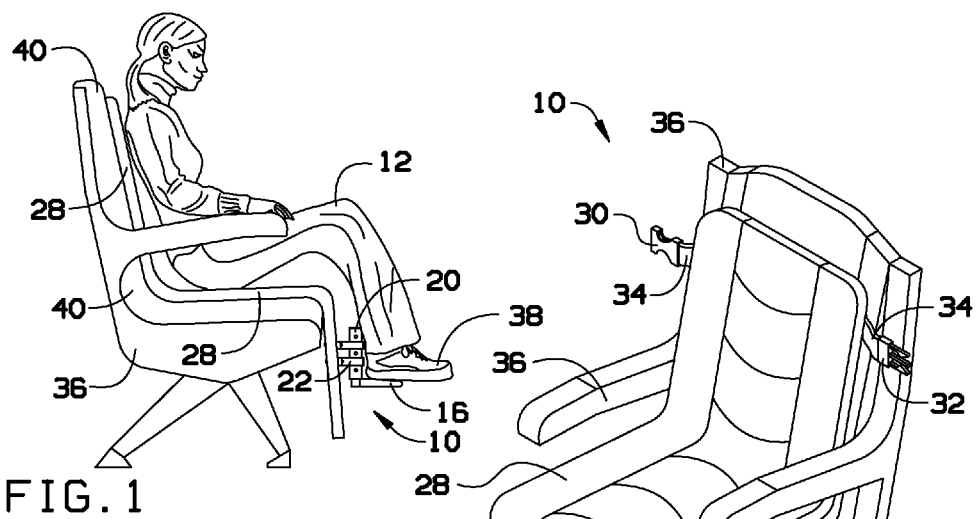
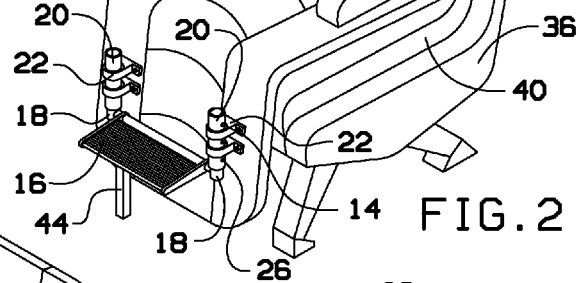
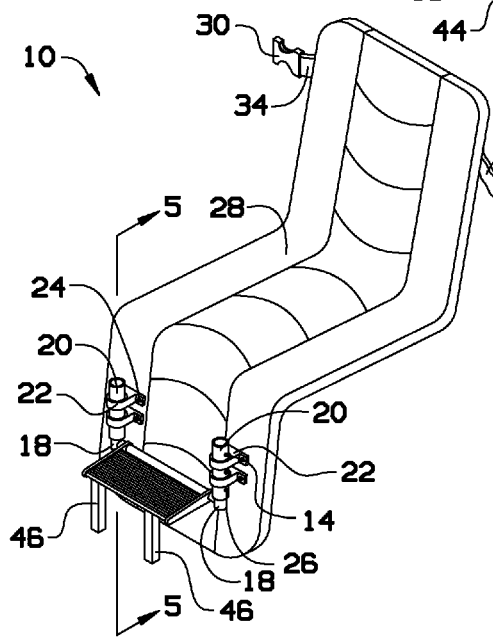
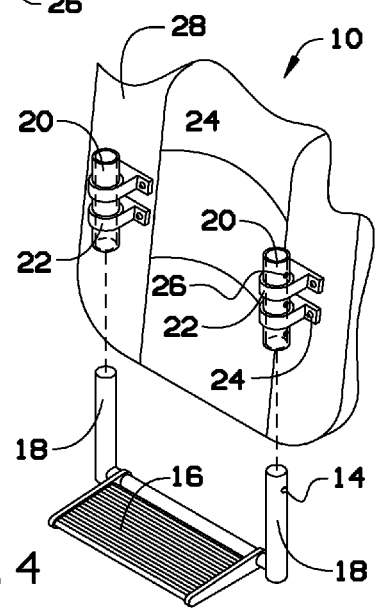

AIRLINE/TRAIN TRAVEL STEP

BACKGROUND OF THE INVENTION

The present invention relates to travel accessories and, more particularly, to a portable foot rest that allows mass transit passengers to rest their feet on an adjustable step.

When traveling, especially in economy class, there is often little room to reposition one's feet. This can be especially true if, on an aircraft, there is a bag stored under the seat in front of the passenger.

Staying in one position for an extended period of time can become quite uncomfortable. While a passenger can shift in their seat or move their feet the few inches that are available, there are few options, short of standing up, to reposition oneself.

As can be seen, there is a need for a portable device that a user can bring with them to provide at least one additional position for a passenger to position themselves.

SUMMARY OF THE INVENTION

In one aspect of the present invention, a travel step device comprises a flexible cushion material operable to be placed on a transportation seat and take the shape of the transportation seat; and a foot rest step removably and adjustably attached to a foot end of the flexible cushion material.

In another aspect of the present invention, a travel step device comprises a flexible cushion material operable to be placed on a transportation seat and take the shape of the transportation seat; a seat cushion female pole attached to opposite sides of the foot end of the flexible cushion material; a plurality of cushion brackets securing the seat cushion female poles to the foot end of the flexible cushion material; a foot rest step; and a foot rest male pole attached at opposite sides of the foot rest step, the foot rest male poles interconnecting with the seat cushion female poles, wherein each seat cushion female pole includes a plurality of spring clip holes and each seat cushion male pole includes a spring clip fitting into a selected spring clip hole to retain the foot rest step at a desired height.

These and other features, aspects and advantages of the present invention will become better understood with reference to the following drawings, description and claims.

BRIEF DESCRIPTION OF THE DRAWINGS

FIG. 1 is a side view of a passenger in a seat using a travel step according to an exemplary embodiment of the present invention;

FIG. 2 is a perspective view of the seat of FIG. 1, with the passenger removed therefrom;

FIG. 3 is a perspective view of the travel step of FIG. 1, removed from the seat;

FIG. 4 is a detailed, perspective, partially exploded view showing the attachment of the step to the seat of the present invention;

DETAILED DESCRIPTION OF THE INVENTION

Figure 5:
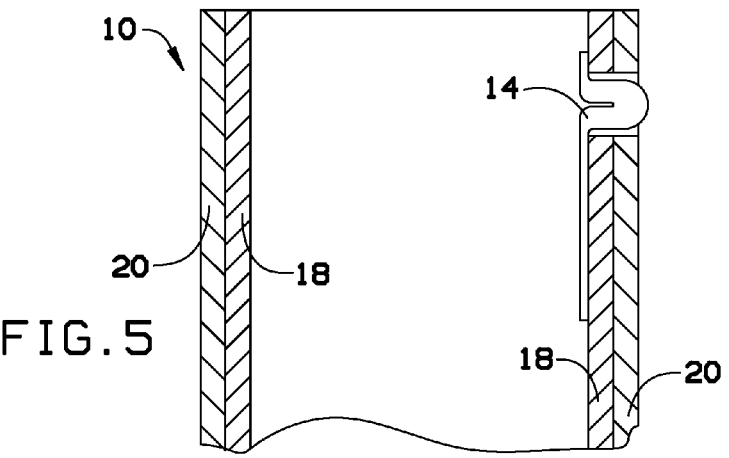
FIG. 5 is a cross-sectional view taken along line 5-5 of FIG. 3.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a portable cushion and foot rest that allows mass transit passengers, especially those in economy class, to rest their feet on an adjustable step. The cushion and foot rest adds comfort to passenger's "bottoms" as well as rests their feet for long flights. The cushion and foot rest folds easily for easy carry-on and stays in position by the weight of the passenger sitting on it. The cushion and foot rest can alleviate aches, pain and leg and foot cramping by allowing the passenger to lift their legs and reposition, improving comfort and circulation.

Referring now to FIGS. 1 through 5, a travel step device 10 can include a cushion front 28 and a cushion back 42 designed to take the shape of a transportation seat 36 and rest on top of a transportation seat cushion 40. The travel step device 10 can be disposed on the transportation seat 36 prior to the user 12 sitting on top of the cushion front 28.

First and second seat cushion female poles 20 can be attached at a lower end of the travel step device 10. The seat cushion female poles 20 can be attached to the cushion front 28 with a plurality of cushion brackets 22. In some embodiments, the cushion brackets 22 can be attached with cushion bracket rivets 24. Other attachment means for attaching the seat cushion female poles 20 are contemplated within the scope of the present invention. In some embodiments, a short board or rigid support may be used to provide support for the cushion brackets 22.

The seat cushion female poles 20 can include a plurality of cushion female pole spring clip holes 26. Typically about three holes 26 can be disposed along the length of the seat cushion female poles 20. A foot rest step 16 can have a foot rest male pole 18 disposed on each end thereof. The foot rest male poles 18 are operable to be inserted into the seat cushion female poles 20. The foot rest male poles 18 each include a foot rest pole spring clip 14. The spring clip 14 can extend into the cushion female pole spring clip hole 26 to secure the foot rest step 16 at a desired height. If the user desired to adjust the height of the foot rest step 16, they can press in on the foot rest pole spring clip 14 to allow the male pole 18 to slide along the female pole 20 until the foot rest pole spring clip 14 finds another female pole spring clip hole 26. The user 12 can then place their feet 38 in the foot rest step 16 to provide an alternate position to provide user comfort while sitting in the transportation seat 36.

In some embodiments, a foot rest support 44 can be provided to extend from an outer edge of the foot rest step 16. The foot rest support 44 can be adjustable in length so that if the height of the foot rest step 16 is adjusted, the length of the foot rest support 44 can be adjusted to match (and create a relatively level foot rest step 16). The foot rest support 44 is especially useful for use on seats that have little or no support under the cushion to support the foot rest step 16. The foot rest support 44 can be retracted and/or folded against the foot rest step 16 for storage. In some embodiments, a single foot rest support 44 can be used. In other embodiments, multiple foot rest supports 46 can be used, such as two foot rest supports 46 disposed on each outer corner of the foot rest step 16.

Figure 6:
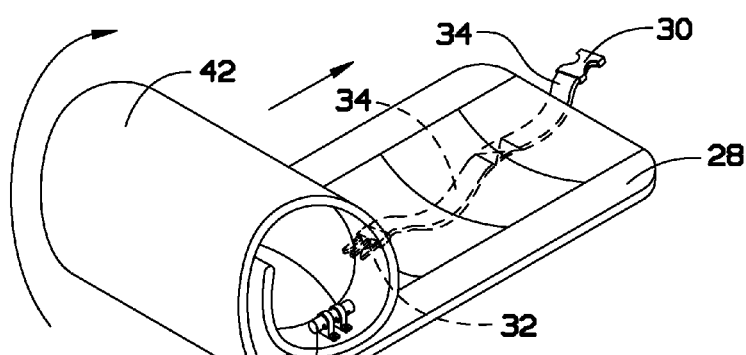
FIG. 6 is a perspective view illustrating a partially rolled-up configuration of the seat of FIG. 1.
Figure 7:
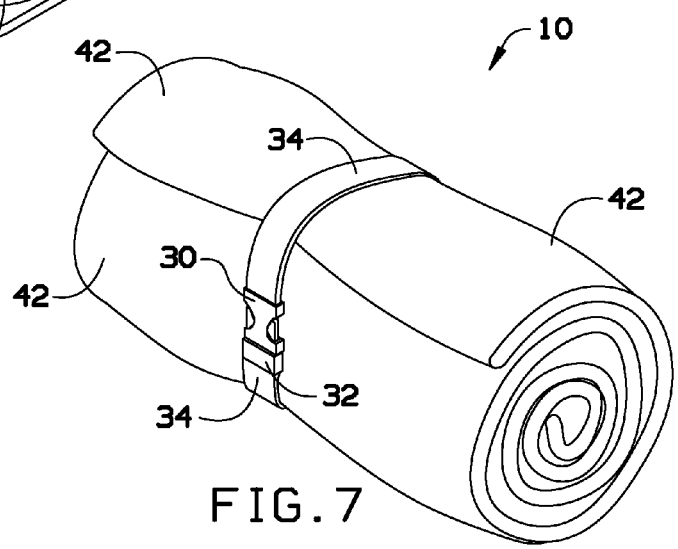
FIG. 7 is a perspective view illustration a completely rolled-up configuration of the seat of FIG. 1.

Referring now to FIGS. 6 and 7, the travel step device 10 can be provided in a roll for ease of carrying. An elastic strap 34 can attach to the back of the travel step device 10, near a top end thereof. A female clip 30 can be disposed on one end of the elastic strap 34 and a male clip 32 can be disposed on another end of the elastic strap 34.

The travel step device 10 of the present invention can be made from various materials, typically a heavy duty plastic to make the device light-weight and to decrease inspection at security stops at airports, for example. The cushion front 28 and/or cushion back 42 can be made from a foam seat cushion material covered in a fabric or leather material, for example.

The foot rest step 16 can be made in various sizes. In one embodiment of the present invention, the foot rest step 16 is about 12 inches long and about 8 inches wide. The foot rest step 16 can be disposed against the cushion front 28 (as shown in the Figures) or may be disposed outward to provide a footrest type of configuration.

The travel step device 10 of the present invention can be easily deployed for use and rolled up and stowed, for example, under a seat prior to landing.

It should be understood, of course, that the foregoing relates to exemplary embodiments of the invention and that modifications may be made without departing from the spirit and scope of the invention as set forth in the following claims.

What is claimed is:

1. A travel step device comprising:
    a flexible cushion material operable to be placed on a transportation seat and a seat back and take the shape of the transportation seat and the seat back;
    a plurality of cushion brackets securely attached directly onto the flexible cushion material;
    a plurality of seat cushion female poles securely attached directly to the plurality of cushion brackets placed on opposite sides of a foot end of the flexible cushion material;
    a foot rest step; and
    a plurality of foot rest male poles attached at opposite sides of the foot rest step, wherein the foot rest male poles removably interconnect with the seat cushion female poles.

2. The travel step device of claim 1, wherein each seat cushion female pole includes a plurality of spring clip holes and each seat cushion male pole includes a spring clip fitting into a selected spring clip hole to retain the foot rest step at a desired height.

3. The travel step device of claim 1, further comprising at least one foot rest support extending from an outer edge of the foot rest step.

4. The travel step device of claim 1, further comprising an elastic strap attached to a back side of the flexible cushion material, wherein the elastic strap secures the travel step device in a rolled configuration.

5. The travel step device of claim 4, further comprising a male clip on a first end of the elastic strap and a female clip on a second end of the elastic strap, wherein the male clip and the female clip are operable to interlock and retain the travel step device in a rolled configuration.

6. A travel step device comprising:
    a flexible cushion material operable to be placed on a transportation seat and a seat back and take the shape of the transportation seat and the seat back;
    a seat cushion female pole attached to opposite sides of a foot end of the flexible cushion material;
    a plurality of cushion brackets securely attached directly onto the flexible cushion material, wherein the plurality of cushion brackets secure the seat cushion female poles to the foot end of the flexible cushion material;
    a foot rest step;
    a foot rest male pole attached at opposite sides of the foot rest step, the foot rest male poles removably interconnecting with the seat cushion female poles, wherein each seat cushion female pole includes a plurality of spring clip holes and each seat cushion male pole includes a spring clip fitting into a selected spring clip hole to retain the foot rest step at a desired height; and
    an elastic strap attached to a back side of the flexible cushion material, wherein the elastic strap secures the travel step device in a rolled configuration.

7. The travel step device of claim 6, further comprising a male clip on a first end of the elastic strap and a female clip on a second end of the elastic strap, wherein the male clip and the female clip are operable to interlock and retain the travel step device in a rolled configuration.

\* \* \* \* \*